(No Model.)
G. A. MARSH.
FRUIT GATHERER.
No. 457,516. Patented Aug. 11, 1891.
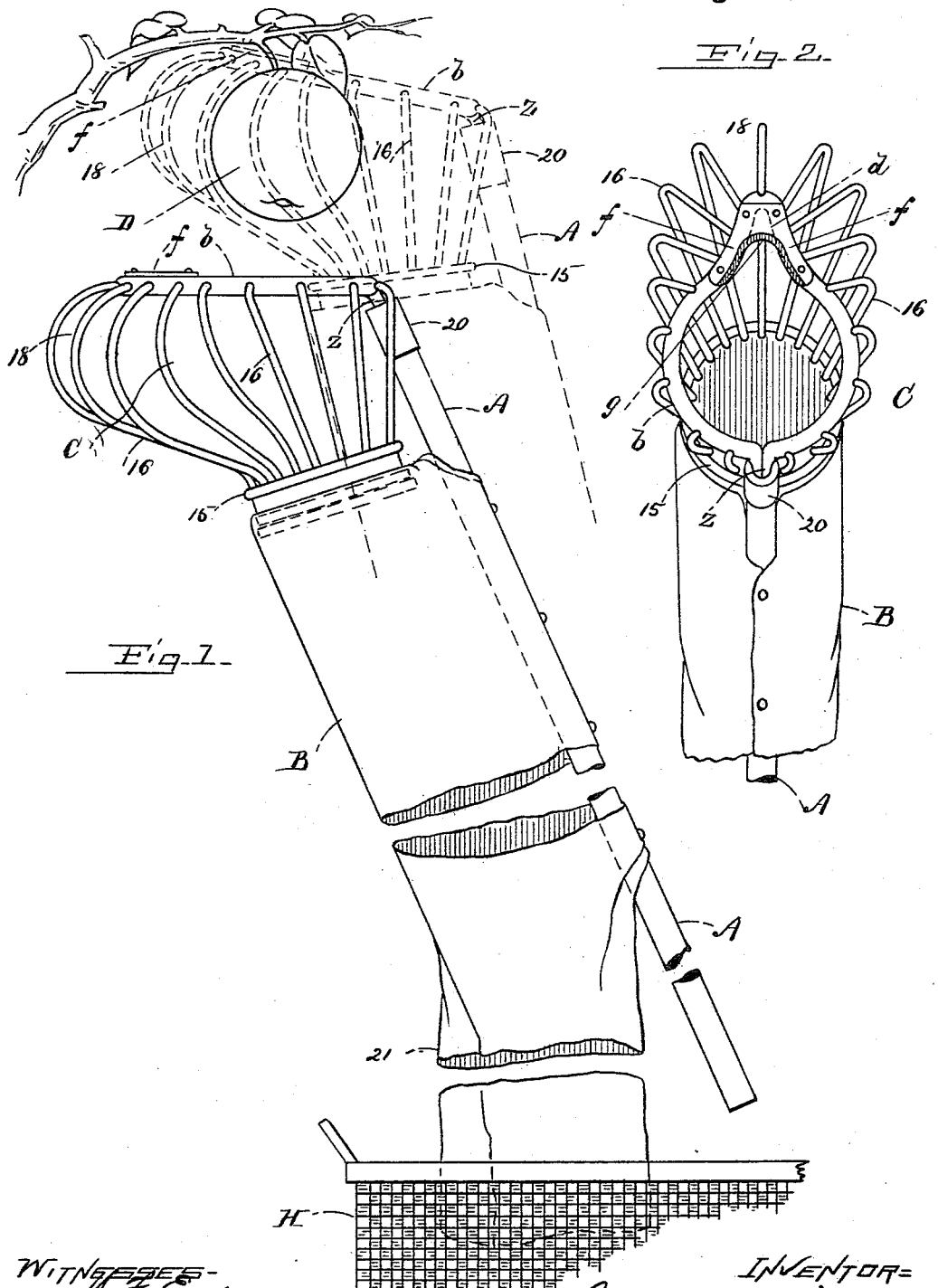

UNITED STATES PATENT OFFICE.

GEORGE ALBERT MARSH, OF DIXFIELD, MAINE.

FRUIT-GATHERER.

SPECIFICATION forming part of Letters Patent No. 457,516, dated August 11, 1891.

Application filed October 13, 1890. Serial No. 367,907. (No model.)

*To all whom it may concern:*

Be it known that I, GEORGE ALBERT MARSH, of Dixfield, in the county of Oxford, State of Maine, have invented certain new and useful Improvements in Fruit-Pickers, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved picker, and Fig. 2 a front elevation of the same represented as in use.

Like letters and figures of reference indicate corresponding parts in the different figures of the drawings.

My invention relates to a device for gathering fruit; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the pole; C, the cage; B, the chute, and H the receiving-basket.

The pole A, of any suitable size and length, may be provided with a socket 20 at its upper end.

The cage C is composed of an upper ring $b$, a lower ring 15, and outwardly-bowed rods 16, attached at their opposite ends to said rings. The ring $b$ is provided with a shank Z, adapted to engage the socket 20 of the pole and diametrically opposite said shank with a loop-shaped extension $d$. A knife $f$ is detachably secured to the ring $b$ across said extension. This knife has a U-shaped cutting-edge $g$. The outwardly-bowed rods extend abruptly outward near their upper ends, especially opposite the extension $d$, and form a bulge 18, into which the fruit projects as it is being cut off.

In the use of my improvement the operator forces the top of the pole into the tree, the hoop $b$ encircling the fruit D, which thus enters the mouth of the holder. By moving the pole laterally the knife-edge $g$ is brought against the stem $t$, the fruit D entering the space 18 under said knife, cutting said stem, and permitting the detached fruit to fall into the holder, from which it readily passes through the chute and is caught or discharged into a receiver H. The knife $f$, being detachable, may be removed and sharpened as required. The end of the pole may be socketed at 20 and the hoop provided with an arm, as $z$, for entering said socket and supporting it in the pole. When not in use, the chute is collapsed against the ring.

Preferably only the upper portion of the chute is secured around the pole, the lower end 21 hanging loose and the pole protruding from the side of the chute, as shown in Fig. 1. By bending the wires of the holder laterally to form the space 18 the knife may much more readily be forced against the stem to cut it, the body of the fruit being retained in the holder.

Having thus explained my invention, what I claim is—

1. In a fruit-picker, the combination of a pole, a cage composed of two rings and outwardly-bowed rods connecting said rings, said cage being attached at its upper ring to said pole, a knife attached to said cage, and a flexible chute connected at its upper end to the lower ring of the cage, substantially as described.

2. In a fruit-picker, the combination of a pole, a cage comprising the rings $b$ and 15 and the rods 16, bent outwardly and forming a fruit-holding bulge 18, and a fruit-plucking knife, substantially as described.

GEORGE ALBERT MARSH.

Witnesses:
 FRANK S. HARLOW,
 I. F. STOCKBRIDGE.